United States Patent [19]

Engel et al.

[11] Patent Number: 5,087,529
[45] Date of Patent: Feb. 11, 1992

[54] LAMINATE MATERIAL

[75] Inventors: Ulrich Engel; Karl-Heinz Wegner, both of Bad Schwalbach, Fed. Rep. of Germany

[73] Assignee: Glyco Aktiengesellschaft, Wiesbaden, Fed. Rep. of Germany

[21] Appl. No.: 457,755

[22] PCT Filed: Apr. 13, 1989

[86] PCT No.: PCT/DE89/00220
§ 371 Date: Dec. 20, 1989
§ 102(e) Date: Dec. 20, 1989

[87] PCT Pub. No.: WO89/10423
PCT Pub. Date: Nov. 2, 1989

[30] Foreign Application Priority Data

Apr. 23, 1988 [DE] Fed. Rep. of Germany ....... 3813804

[51] Int. Cl.$^5$ ............................................. B22F 3/00
[52] U.S. Cl. .................................... 428/552; 428/551; 428/553; 428/650; 428/680; 426/681; 427/38; 427/415
[58] Field of Search ............... 428/650, 551, 680, 552, 428/553; 427/405, 38

[56] References Cited

U.S. PATENT DOCUMENTS

| 2,998,322 | 8/1961 | Strate | 117/22 |
|---|---|---|---|
| 4,099,804 | 7/1978 | Baker et al. | 428/552 |
| 4,172,622 | 10/1979 | Baker et al. | 428/626 |
| 4,193,645 | 3/1980 | Baker et al. | 428/419 |
| 4,404,263 | 9/1983 | Hodes et al. | 428/564 |
| 4,666,787 | 5/1987 | Bickle et al. | 428/550 |
| 4,830,933 | 5/1989 | Hodes et al. | 428/640 |
| 4,889,772 | 12/1989 | Bergmann et al. | 428/547 |
| 4,900,639 | 2/1990 | Hodes et al. | 428/610 |

FOREIGN PATENT DOCUMENTS

| 2615022 | 7/1977 | Fed. Rep. of Germany. |
|---|---|---|
| 89/00220 | 4/1989 | Fed. Rep. of Germany. |
| 3704328 | 6/1991 | Fed. Rep. of Germany. |
| 1451074 | 7/1966 | France. |
| 1513847 | 6/1978 | United Kingdom. |
| 8800251 | 1/1988 | World Int. Prop. O.. |

Primary Examiner—Stephen J. Lechert, Jr.
Attorney, Agent, or Firm—Herbert Dubno

[57] ABSTRACT

In a laminate material or a laminate workpiece with a functional layer affixed to one surface of a solid backing layer, the functional layer consisting of components which are not soluble in one another, thus normally forming a heterogeneous structure, a finely dispersed distribution of the undissolved components in a matrix of the functional layer is created, due to the fact that the components forming the functional layer are affixed to the backing layer as a fine powder material in the form of a powder mixture or agglomerated powder or predispersed powder formed through air plasma spraying. Thereby the backing layer itself contains a partial layer to be coated having a heterogeneous structure or a crystalline structure, for instance a lead bronze layer or a lead tin bronze layer. This partial layer is created in a surface region by the action of the plasma flame in a strictly defined zone down to a certain depth, for instance 20 to 200 μm, where it is continuously melted down while the functional layer is built up from fine powder material over this molten bath and the area surrounding it. Through an immediately following cooling with high cooling rate, the surface regions of the partial layer and the functional layer are frozen in a dispersed to a finely dispersed form. Optionally, between the partial layer and the functional layer, an intermediate adhesive layer can be provided, preferably through air plasma spraying, in order to achieve this way the desired structure change in the surface region of the backing layer.

15 Claims, 3 Drawing Sheets

LAMINATE MATERIAL

FIELD OF THE INVENTION

The invention relates to a laminate material or a laminate workpiece comprising a functional layer, particularly a friction bearing layer, applied to one of the surfaces of a solid backing layer, for instance as a solid dispersion layer with a matrix having at least one fusible component and dispersion elements which at least in the solid state are insoluble in the material of the matrix, or at least soluble in smaller amounts than the ones present, or made of another mixture suitable for tribological purposes consisting of components not soluble in one another or soluble only in amounts smaller than the ones present. The invention relates also to a process for the production of such laminate materials and laminate workpieces.

THE RELATED ART

All heretofore-known laminate materials and laminate workpieces of this kind have a relatively coarse structure of the functional layer formed as a solid dispersion layer. Therefore, this coarse structure presents considerable disadvantages and drawbacks, especially when such laminate materials and laminate workpieces are used for tribological purposes. In these known laminate materials and laminate workpieces, the bonding of the functional layer to the backing layer is problematic. It is known from DE-OS 26 56 203 to create a laminate material suitable for tribological purposes by thermokinetically applying a dispersion alloy tending towards dissociation, particularly an AlSn dispersion alloy, onto a coarse substrate formed by a sintered structure. According to the aforementioned German Patent, whenever an intermingling of the sintered structure and the dispersion layer is to be obtained under partial welding, it is necessary to make the sintered substrate quite thick, which is unacceptable when functional layers with a reduced thickness have to be produced. However, generally the wear- and corrosion resistance of such known AlSn two-layer composite slide bearings has been proven by experience to be excellent, although this resistance does not apply to all individual cases.

This situation was taken into account and three-layer bearings with sputtered (cathodic sputtering) AlSn have been developed. The layers produced according to this method have an extremely fine Sn-distribution and a high strength. These known slide bearings with sputtered AlSn sliding layer for the high load-carrying capacity of a steel/lead bronze bearing are advantageously combined with the wear- and corrosion-resistance of AlSn alloys, so that such slide bearings behave well in use, but their production costs are very high.

It is therefore an object of the present invention to make available a new kind of construction for laminate materials and laminate workpieces, particularly slide bearings, wherein the advantageous combination of load-carrying capacity and high wear- and corrosion resistance is also achieved, but whereby this new composite material or new composite workpieces can be produced at a much lower cost than laminate materials and laminate workpieces with sputtered functional layers, so that laminate materials or workpieces with such high qualifications can also be produced on an industrial scale in large series.

SUMMARY OF THE INVENTION

According to the invention, this problem is solved in the laminated materials or laminated workpieces of the invention due to the fact that the functional layer formed through air-plasma spraying of fine powders containing the fusible matrix components and the dispersion components which are either not soluble in the matrix material or soluble only in amounts smaller than the amount present, is formed as a solid dispersion layer with a matrix wherein the dispersion elements are distributed as finely dispersed particles of components which are not dissolved in the matrix, and this functional layer is bonded to the surface of the backing layer directly or through a thin intermediate adhesive layer, whereby the backing layer in the zone bordering the functional layer has a reduced thickness of approximately 25 μm to 300 μm and a finer structure.

As a result of the invention, on the one hand a finely dispersed distribution of the dispersion elements within the matrix of the functional layer is achieved, so that the so-formed functional layer comes close to the sputtered sliding layers, particularly from the point of view of wear- and corrosion resistance. On the other hand, an essentially improved bonding is achieved of the functional layer to the backing layer or to an intermediate adhesive layer possibly provided between the backing layer and the functional layer. The structural change in a surface region of the backing layer produced by fusion and rapid cooling results in the further special advantage that due to such a refining of the structure, the durability of the substrate material is enhanced, thereby improving the support effect of the backing layer. Even after the wear of functional or sliding layer, the free surface of the backing layer is less corrosion-prone, due to the finer structure. Furthermore, the backing layer in the surface area with refined structure offers considerably improved sliding or emergency-running properties, than it is possible to achieve with a backing layer having a structure like the one initially mentioned.

In a preferred embodiment of the invention, the backing layer consists of metal and contains components which are insoluble in the metal of the backing layer, or soluble only in amounts smaller than the ones present, whereby in the zone bordering the functional layer, these components are imbedded in the metal of the backing layer in a much finer distribution than in the rest of the backing layer Particularly in such a preferred embodiment of the invention, the backing layer consists of a dispersion alloy with metallic matrix and in the matrix of the dispersion alloy an imbedded fusible dispersion components are frozen in the border zone between the backing layer and the functional layer. The backing layer can be made thereby especially of cast or sintered lead bronze with a lead content up to 40% by Weight, preferably between 15% by weight and 30% by weight. Up to now, only lead bronzes with a lead content of up to approx. 25% by weight could be cast-plated. Through powder-metallurgy or sintering techniques, lead bronze composite materials with a lead content higher than 30% by weight can be produced. Due to the invention, considerably improved sliding or emergency-running properties in the surface area facing the sliding layer can be obtained in the case of cast-plated as well as sintered lead bronze layers, by performing a refining of the structure in the surface area of the backing layer simultaneously with the application of the sliding layer.

Within the framework of the invention, it is possible to form a functional layer as a dispersion layer whose matrix contains at least one of the following metallic components: aluminum, copper, zinc and whose dispersion elements contain at least one of the following components: lead, tin, indium, bismuth, molybdenum, molybdenum bisulfide, (preferably in the form of metal-encased particles), boron nitride, carbon (particularly in the form of graphite particles encased with metal, such as nickel, aluminum, copper) plastic materials suited for tribological applications, such as polyester, PTFE, PEK, PEEK. Surprisingly, in the material combinations based on a selection of the above-mentioned groups of materials it is possible to achieve a very finely dispersed distribution of the dispersion elements up to high concentrations. At the same time it is possible to establish a desired hardness of the sliding layer between 60 HV and 80 HV, when the cooling rate of the functional layer applied by plasma spraying is set between $10^4$ K/s and $10^5$ K/s. The required cooling rate can be set through the appropriate coordination of the powder fraction, the mass flow of powder and process gas, the process gas mixture, the spray-cycle sequence and of the thickness of the functional layer with the thickness and the material structure of the substrate.

In order to improve the adhesion of the functional layer, between the backing layer and the functional layer a thin intermediate adhesive layer can be provided, containing metallic components which react exothermically with one another and/or with the metallic components of the backing layer and/or with the metallic components of the functional layer. Here has to be taken into consideration that the intermediate adhesive layer has to contain one of the following components: molybdenum, nickel/aluminum alloy, nickel/aluminide, nickel-chromium alloy, nickel/copper alloy, pure aluminum, aluminum alloys such as AlSi8. Thereby, the intermediate adhesive layer can be applied as a complete layer on the face of the backing layer supporting the functional layer, through air plasma spraying. It is also conceivable that the intermediate adhesive layer is sintered on the surface of the backing layer supporting the additional layer in the manner of a rough base in a single layer or a few layers of fine particles.

Preferably, the invention is applied to the field of manufacturing tribological elements. Thereby, similar to the intermediate layer of a three-layered slide bearing, the backing layer can be affixed to a substrate, for instance a steel backing, on the one side, and on its other side it can support the functional layer which can be a friction bearing or run-in layer consisting of dispersion alloys on an aluminum/lead base or an aluminum/tin base, whereby the functional layer has a thickness between 10 $\mu$m and 100 $\mu$m, preferably between 15$\mu$m and 50 $\mu$m.

The production of the laminate material or workpieces of the invention starts out with a process wherein the functional layer is formed from metallic dispersion alloys or from other structures suitable for tribological purposes by air plasma spraying of fine powder materials. A process of this kind already known from DE-OS 26 56 203 can not be used for the production of the laminate materials or laminate workpieces according to the invention, especially not when the backing layer itself has a heterogeneous structure, e.g. of the dispersion-alloy type. In the process according to the invention, the functional layer is directly applied as a dispersion alloy or another structure suitable for tribological purposes through air plasma spraying onto the surface of the backing layer or onto the previously formed thin intermediate adhesive layer. During the plasma spraying the distance between the plasma flame and the surface to be coated is selected in coordination with the available installation output and the kind of the respectively processed powder material, being set and maintained in such a manner that the metal of the backing layer is molten in the surface area thereof to a depth between approximately 25 $\mu$m and approximately 300 $\mu$m by the plasma flame. Cooling is immediately performed following the plasma spraying and effective in the spray layer and the molten zone of the backing layer at an admissible cooling rate (cooling speed) between $10$ K/s and $10^5$ K/s, preferably between $10^3$ /s and $5 \cdot 10^4$ K/s, which is high in view of the shrinkage characteristics of the backing layer, the intermediate adhesive layer and the formed functional layer and their mutual bonding zones. Due to the energy used during the plasma spraying of the functional layer, which is sufficient to melt also a thin surface area of the backing layer, an optimal bond between the backing layer and the functional layer is insured, especially then when a thin intermediate adhesive layer is also provided between the backing layer and the functional layer. Due to the fact that the plasma spraying is followed by an immediate quick cooling of the molten surface area of the backing layer, as well as of the formed functional layer, a finely dispersed distribution of the dispersion elements in the matrix and a freezing of the matrix with the dispersion elements in this state occur. Additionally, the chemical and quasi-chemical compounds resulting from the exothermic reactions in the bonding zone(s) are inhibited by the quickly starting, efficient cooling, so that there is created a very tight-meshed net of diffusion areas.

Within the framework of the invention, the functional layer can be formed through air plasma spraying from powder mixtures, containing the fusible matrix components and the components which are insoluble in the matrix, or soluble only in smaller amounts than the ones present in the matrix. In the process according to the invention, it is possible to proceed instead or additionally by air plasma spraying the functional layer from agglomerated powders (micropellets) with or without organic binders, whereby also this agglomerated powder has to contain the fusible matrix components and the components to be dispersed in the matrix, which are insoluble in the matrix material or soluble in amounts smaller than the ones present. The used powder mixture of the powder aggregate can contain powder particles coated by additional substances. Such coating can for instance be affixed to the particles through adhesives. The powder to be processed can be fed to the plasma flame in a single point. However, it is also possible to process various powders at the same time, and optionally to feed them to the plasma flame in different points In addition to the dispersion elements to be distributed throughout the matrix, it is also possible to imbed in the functional layer hard particles with a size between approximately 10 $\mu$m and 200 $\mu$m. In accordance with the invention, these hard particles to be imbedded are preferably also introduced in the plasma flame. For this purpose, hard particles consisting of one or more substances from the group TiC, WC, glass powder, $Si_3N_4$, SiC, $Al_2O_3$ have to be considered. Instead of these or in addition thereto, hard particles on the basis of Laves-phases ($AB_2$), preferably of the type $MgCu_2$ or of the type $MgZn_2$ or $MgNi_2$ can also be considered, whereby the radius rate of the A-atoms and the B-atoms is $$r_A/r_B = 1.225.$$

Instead of or in addition to the introduction of hard particles into the plasma flame, it is also possible to produce the hard particles to be imbedded in the functional layer by reactive plasma spraying, i.e. by carrying out chemical or quasi-chemical reactions during plasma spraying. If the powder material used for the production of the functional layer contains components capable of forming hard oxide particles and/or hard nitride particles, it is possible to coordinate the mass flow and the composition of the process gas maintained during plasma spraying with a preset range of chemical or quasi-chemical reactions of these components with the surrounding air, i.e. the atmospheric oxygen and/or atmospheric nitrogen. However, in order to produce hard particles during air plasma spraying by using powder materials with hard chemical compounds or quasi-chemical compounds forming components with gaseous reactants for the formation of the functional layer, it is also possible to admix to the process gas used for the plasma flame such gaseous reactants in predetermined amounts, corresponding to the mass flow to be maintained during plasma spraying.

Within the framework of the invention, the functional layer can be formed through air plasma spraying from a powder mixture containing the fusible matrix components of dispersion alloys with metallic matrix comprising one or several of the metals: aluminum, copper, zinc, silver and dispersion elements, at least one of the following components: lead, tin, indium, bismuth, nickel, copper, manganese, silicon, carbon (advantageously graphite particles encased by metals such as nickel, aluminum, copper), molybdenum disulfide (preferably metal-encased), boron nitride, plastic materials such as polyester, PTFE, PEK, PEEK, applied through air plasma spraying onto an iron-containing backing layer, preferably a backing layer of killed steel, whereby the cooling takes place at a cooling rate between $10^3$ K/s and $5 \cdot 10^4$ K/s.

If a thin intermediate adhesive layer between the backing layer and the functional layer is desirable or required, this layer can be sintered to the surface of the backing layer to be coated as a rough ground or as a a few layers of fine particles through air plasma spraying. However, it is not required to form a rough intermediate adhesive layer. Other types of applied intermediate adhesive layers can also be taken into consideration. For instance there can be present galvanically applied intermediate adhesive layers, or also preferably intermediate adhesive layers which are applied by air plasma spraying onto the surface of the backing layer to be coated with the functional layer, whereby the backing layer is molten to a minimal depth between 25 μm and 300 μm and thereby a cooling is performed maintaining a cooling rate between $10^2$ K/s and $10^5$ K/s.

In all cases it is possible to apply an intermediate adhesive layer containing metallic components, which react exothermically, either mutually and/or with the metallic components of the functional layer to be applied afterwards. Hereby have to be considered intermediate adhesive layers made of one or several of the following substances: molybdenum, nickel/aluminum alloy, nickel/chromium alloy, nickel/copper alloy, pure aluminum, aluminum alloys, such as AlSi8.

In order to control the desired limited course of exothermic reactions of the chemical or quasi-chemical type and to achieve the formation of a fine structure in the dispersion of the functional layer, it is advisable to carry out high-efficiency cooling during and/or immediately after the coating through air plasma spraying. This can be done with cooling rollers, which keep the backing layer of the laminate material or workpiece in heat-conductive contact. An even more intensive cooling can be achieved when the uncoated side of the backing layer is brought into contact with liquid or gaseous cooling media. In addition, it is also possible to direct a gaseous medium onto the timely formed functional layer.

BRIEF DESCRIPTION OF THE DRAWINGS

Embodiment examples of the invention are subsequently described with the aid of the drawing, which shows.

DETAILED DESCRIPTION

Figure 1:
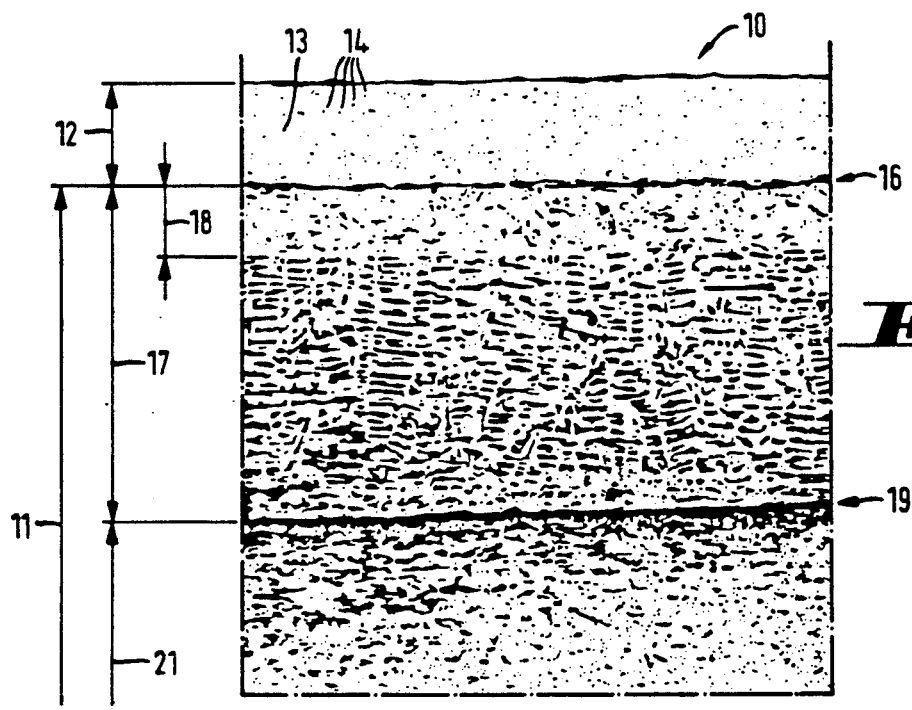
FIG. 1 a partially sectioned view as a polished section of a first embodiment of the laminate material according to the invention.

In the example of FIG. 1, the laminate material 10 for the production of tribological elements, particularly friction bearings, is represented. Correspondingly, the laminate material 10 has a backing layer 11 made of passivated steel, which after processing constitutes the steel back of the slide bearing produced from the laminate material 10. A cast layer 17 made of friction bearing material with good emergency-running characteristics, in this example consisting of lead tin bronze with 10% by weight lead content, 10% by weight tin and the balance copper, is provided on the backing layer 11. This lead bronze layer 17 represents a part of the backing layer for the support of the functional layer 12 affixed thereto. In the represented example, the functional layer 12 consists of an aluminum/lead dispersion alloy, e.g. with a 15% by weight content of lead. Correspondingly the functional layer has a matrix 13 of aluminum and within this matrix finely dispersed lead particles 14. In this type of structure, the functional layer 12 has a hardness of approximately 50 HV.

Underneath the functional layer 12, a surface zone 18 of the lead bronze layer 17 with a refined structure is formed. While the remaining part of the lead bronze layer 17 has a dentritic structure, in this surface zone 18 a finely dispersed distribution of lead—and tin particles is formed in the copper matrix.

This surface zone 18 is formed because during the application of the functional layer 12 through air plasma spraying, the lead bronze layer on its free surface is molten down to a depth corresponding to the surface zone 18, i.e. approximately 50 μm by the plasma flame, in a very small area travelling with the relative advance, and the thereby generated small molten bath is very rapidly cooled down after the application of the functional layer 12, together with the applied functional layer 12. As a result, the lead tin in the surface zone 18 is frozen in the copper matrix 13 in a very finely dispersed distribution of the lead and the tin. The same way, the lead particles are frozen in the matrix 13 of the functional layer 12 in a finely dispersed form, before the lead an coagulate into larger particles.

In the formation zone 16 between the surface zone 18 and the functional layer 12, a dispersion mixture of aluminum, lead, tin and copper is present, because during the air plasma spraying particles of the powder material containing the components of the functional layer 12 are introduced with kinetic energy into the local molten bath created in the surface zone of the lead tin bronze layer 17. This way is achieved an extremely effective durable bond of the functional layer 12 to the surface zone of the lead tin bronze layer 17. In the second bonding zone 19, which is located within the backing layer, between the steel and the lead tin bronze layer 17, a diffusion bonding exists, which was produced during the casting of the lead tin bronze layer 17 onto the steel back. In order to create this diffusion bonding, during the production of the steel/lead tin bronze bonding, sufficient heating of the steel and a correspondingly slow cooling had to be accepted, although due to this fact in the lead tin bronze layer 17 the dentritic structure which can be seen in FIG. 1 appeared as a result. Due to the ulterior formation of the surface zone 18 with the dispersed distribution of lead and tin in the copper matrix, the disadvantages of the dentritic structure in the remaining portion of the lead tin bronze layer 17 was practically cancelled.

In addition to improved friction bearing characteristics and in addition to improved corrosion protection, the surface zone with the dispersed distribution of lead and tin in the copper matrix, formed immediately underneath the functional layer 12 offers also an improved substrate for the functional layer with the above-described improved bonding.

In the example of FIG. 2 it is again the laminate material 10 which is provided for the production of tribological elements, particularly friction bearings. In this example, the laminate material 10 has between the steel backing 21 and the lead bronze layer 27 forming the backing layer 11, an intermediate adhesive layer 22, which in this example consists of nickel copper alloy. However, it can also consist of molybdenum, nickel-/aluminum alloy, nickel aluminide, nickel/chrome alloy, pure aluminum or an aluminum alloy, for instance AlSi8. This intermediate adhesive layer 22 is applied to the free surface of the lead bronze layer 27 by air plasma spraying. Hereby, the plasma torch is set so that the lead/bronze layer 27 is locally molten down to a depth of approximately 50 μm, namely exactly at these points on the intermediate adhesive layer where the intermediate adhesive layer 22 has just been produced. A considerable fragment of the particles of the fine powder material used for the intermediate adhesive layer 22 is thereby introduced with kinetic energy into the local molten bath in the surface zone 18 of the lead bronze layer, so that a very strong bond results between the intermediate adhesive layer 22 and the lead bronze layer 27. The surface zone of the lead bronze layer 27 is cooled down very quickly together with the applied intermediate adhesive layer 22, so that the lead bronze does not return to the dentritic structure, but is frozen in the copper matrix with a dispersed distribution of the lead particles.

The lead bronze layer 27 itself is affixed to the steel backing 21 by casting, and has a diffusion bonding of the copper crystallite with the steel, as in customary casting processes.

The functional layer 12 is applied to the intermediate adhesive layer 22 by air plasma spraying. In this process, the plasma torch is set so that it heats the surface zone of the intermediate adhesive layer 22 locally, close to the melting point of the nickel copper alloy. Therefore, also in the bonding zone 23 between the intermediate adhesive layer 22 and the functional layer 12 is formed an intensive diffusion bond between the nickel copper alloy and the aluminum of the matrix 13 of the functional layer 12.

Figure 2:
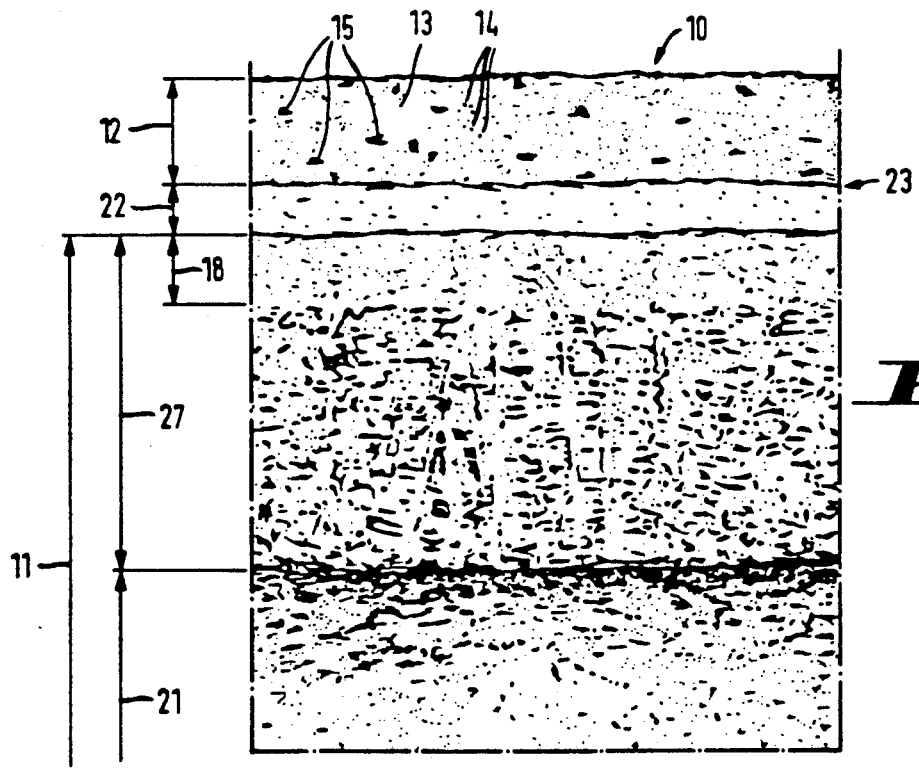
FIG. 2 a partially sectioned view as a polished section of a second embodiment of a laminate material according to the invention.

In the example of FIG. 2, the functional layer 12 contains besides the finely dispersed lead particles in the matrix 13, also additionally imbedded hard particles 15 in the form of Laves-phases. These hard particles 15 have a size of approximately 20 to 30 μm and are shaped like whiskers. Due to this structure, the functional layer could be set to a hardness of approximately 75 HV.

Figure 3:
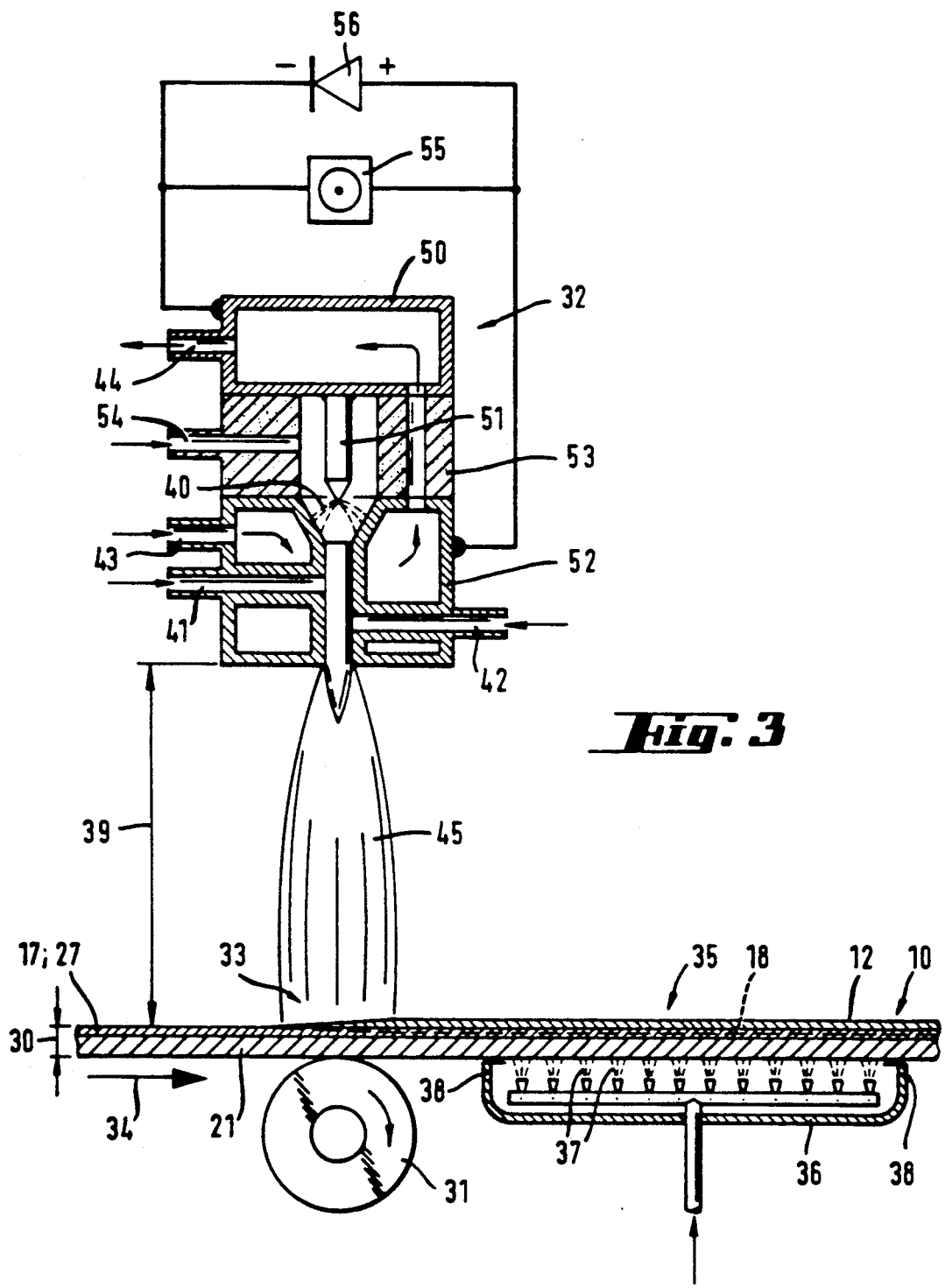
FIG. 3 the schematic representation of a first embodiment of the process according to the invention.

FIG. 3 shows schematically the production process for the laminate material 10 represented in FIGS. 1 and 2. According to this process variant, a composite strip 30 with steel backing 21 and cast lead tin bronze layer 17 and the lead bronze layer 27 are passed in front of a plasma torch 32 via a support roller 31, so that the steel backing 21 is guided over the support roller 31 and the lead bronze layer 17 faces the plasma torch 32. In the portion of the composite strip 30 facing the plasma torch 32 a coating area 33 is formed, immediately followed by cooling area 35 in the advance direction of the composite strip 30 indicated by the arrow 34. In this cooling area 35, the composite strip is passed with its uncoated side over a cooling box in whose interior jets 37 of cooling gas, for instance carbon dioxide possibly mixed with dry ice or jets of cooling fluid, for instance water or oil, are directed against the uncoated surface of the composite strip 30. Preferably the spacial arrangement is such that the steel strip 30 is horizontally passed in front of the plasma torch 32 and is thereby coated on its upper side, while the cooling box 36 is located oppositely to the bottom of the composite strip 30. In order to enhance the cooling effect and in order to capture the cooling fluid, in the illustrated example, the cooling box has at its circumference strip like circumferential wall parts 38 projecting against the lower side of the composite strip 30.

The distance 39 of the plasma torch 32 from the composite strip 30 is adjustable, and in the illustrated example it is set so that lead bronze surface or the lead tin bronze surface of the composite strip 30 facing the plasma torch 32 is melted down by the plasma flame 45 to a depth of approximately 50 μm. The fine-particle, powder-like coating material is applied by the plasma flame 45 through kinetic energy onto this small, narrowly limited molten bath of lead bronze or lead tin bronze. Due to the advance of the composite strip 30 in the direction of the arrow 34, this way a continuous surface region 18 is formed in the lead bronze layer 17 or the lead tin bronze layer 27, and after leaving the coating area 33, it is cooled down very quickly together with the functional layer 12 created through plasma spraying, so that in the surface region 18, the dentritic structure of the lead bronze or of the lead tin bronze can not be formed anew, and on the contrary a freezing in the manner of a fine dispersion occurs. In the freshly formed functional layer the coagulation of undissolved components does no longer take place as a result of the quick cooling, the lead particles and other undissolved particles are rather frozen in a finely dispersed distribution in the matrix of the functional layer.

In the example of FIG. 3, the plasma torch 32 is provided with an electrode part 50 with cathode 51 and an anode forming the nozzle part 52. Between the electrode part 50 and the nozzle part 52, an insulating element 53 is inserted, which contains the inlet 54 for the plasma gas. The electrode part 50 and the nozzle part 52 are connected to a high-voltage generator, comprising a high-frequency high-voltage generator 55 and a high-voltage rectifier 56. With the so-produced electrical high voltage, between the cathode 51 and the nozzle part 52 an electric arc 40 is ignited, through which passes the plasma gas introduced at 54, forming this way the plasma flame 45 which exits the nozzle part 52 and is directed towards the steel band 30 to be coated. Within the nozzle part 52, at 41, the fine powder material for the formation of the functional layer 12 is introduced. This can be either an amount of powder or also a fine powder agglomerate, containing the required components for the formation of the functional layer. However, it is also possible to feed to the plasma flame various powders, namely one kind of powder at 41, and a different kind of powder at 42. For instance, at this second feeding 42 it is also possible to introduce hard particles, which are supposed to be imbedded in the functional layer.

As indicated by the inlet 43 and the outlet 44, the plasma torch 32 is cooled with water.

Figure 4:
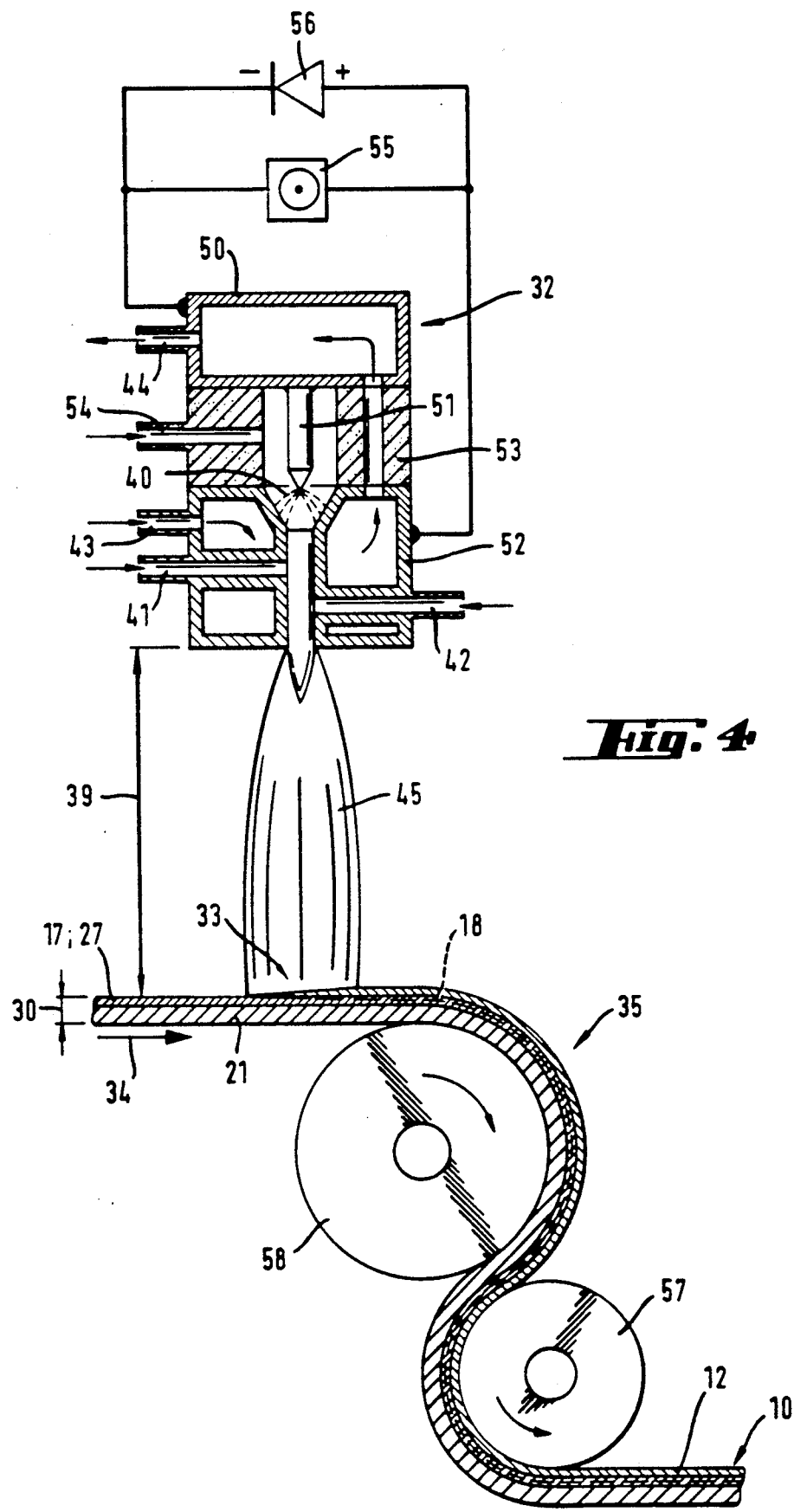
FIG. 4 the schematic representation of a second embodiment of the process according to the invention.

The process variant illustrated in FIG. 4 provides practically the same plasma torch 32 as in the example of FIG. 3, but it differs from the process variant of FIG. 3 by the type of used cooling means. In the example of FIG. 4, a composite strip to be coated is also moved in the direction of the arrow 34 at a distance 39 underneath the plasma torch 32, so that on the upper side of the composite strip 30 a coating area 33 is formed oppositely to the plasma torch, and in this area the composite strip 30 to be coated is under the influence of the plasma flame 45 at its surface of the lead bronze layer 27 or lead tin bronze layer 17. In this coating area, the lead bronze layer 27 or lead tin bronze layer 17 is melted down in a surface region 18 to a depth of, for instance 50 μm by the plasma flame and at the same time coated over the small, narrowly limited formed molten bath and over its surroundings with the fine powder of the coating material, until the functional layer 12 is formed. As soon as the composite strip 30 leaves the coating area 33 in its advance movement in the direction of the arrow 34, it reaches the cooling area 35. There, the coated composite strip 30 or the so-produced laminate material 10 is drawn with its uncoated steel surface over a cooled roller 58, by using a return roller 57. This cooling roller 58 can for instance be cooled with water or any other cooling medium. Through this cooling arrangement, it is also possible to achieve an intensive cooling of the laminate material 10 produced by air plasma spraying, whereby it is possible to achieve a slightly higher cooling rate with the modus operandi indicated in FIG. 3. However, in any case, in both process variants there is achieved a finely dispersed distribution in the matrix of the undissolved components of the functional layer 12, a well dispersed distribution of lead, possibly tin in the surface region 18 of the lead bronze layer 27, or the lead tin bronze layer 17, as well as safe bonding of the functional layer 12 to the surface region 18 of the lead bronze tin layer 17 or lead bronze layer 27.

We claim:

1. A laminate article comprising:
   (i) a solid backing layer; and
   (ii) a functional layer which is a friction bearing layer applied by air plasma spraying of a fine powder to a surface of said solid backing layer, said functional layer being a solid dispersion comprising a matrix having at least one fusible component and dispersion elements selected from the group consisting of those that at least in a solid state are insoluble in said fusible component and those that are soluble only in amounts smaller than those amounts present, said dispersion elements being directly bonded to said surface of said backing layer or indirectly via a thin intermediate adhesive layer, and said backing layer having a border zone bordering said functional layer, said border zone being formed with a refined structure down to a depth of approximately 25 μm to 300 μm.

2. A laminate article according to claim 1 wherein said backing layer is formed of metal and contains components which are insoluble therein or soluble only in amounts smaller than the ones present, said components present in said border zone being imbedded in said metal of said backing layer in an essentially much finer distribution compared to any components present in any remaining portion of said backing layer.

3. A laminate article according to claim 2 wherein said backing layer is formed from a dispersion alloy with metallic matrix and therein imbedded fusible dispersion components, said dispersion components being frozen in said matrix of said dispersion alloy in a finely dispersed distribution within said border zone between said backing and functional layers.

4. A laminate article according to claim 3 wherein said backing layer consists of cast or sintered lead bronze with a lead content ranging between 15% and 30% by weight.

5. A laminate article according to claim 4 wherein said functional layer is formed as a dispersion layer whose matrix contains a metallic component selected from the group consisting of aluminum, copper, and zinc, and whose dispersion elements contain at least a further component selected from the group consisting of lead, tin, indium, bismuth, molybdenum, molybdenum sulfide, boron nitride, carbon and plastic materials.

6. A laminate article according to claim 5 wherein said carbon is in graphite form surrounding a metal selected from the group consisting of nickel, aluminum and copper, and said plastic materials are selected from the group consisting of polyester, polytetrafluoroethylene, polyethylketone and polyether ether ketone.

7. A laminate article according to claim 5 wherein said functional layer has a hardness of between 40 HV and 120 HV.

8. A laminate article according to claim 1 wherein said functional layer has a preestablished fraction of chemical compounds produced during plasma spraying of metallic compounds which are higher than metal forming said matrix of said functional layer, said metallic compounds being metal oxides.

9. A laminate article according to claim 1 wherein hard particles with a size between 10 μm and 200 μm are imbedded in said functional layer, said hard particles being selected from the group consisting of TiC, WC, glass powder, $Si_3N_4$, SiC, $Al_2O_3$ and hard particles based on Laves phases $AB_2$ having a radius proportion of A-atoms and B-atoms of $$r_A r_B = 1.225.$$

10. A laminate article according to claim 1, wherein said thin intermediate adhesive layer between said backing and said functional layers contains metallic components, said metallic components being capable of reacting exothermically with metallic components selected from the group consisting of those found in said backing, functional and adhesive layers.

11. A laminate article according to claim 1 wherein said intermediate adhesive layer contains a component selected from the consisting of molybdenum, nickel-/aluminum alloy, nickel-aluminide, nickel/chrom alloy, nickel/copper alloy, pure aluminum, and mainly aluminum alloys.

12. A laminate article according to claim 11 wherein said intermediate adhesive layer is applied as a continuous layer by air plasma spraying onto a side of said backing layer which receives said functional layer.

13. A laminate article according to claim 11 wherein said intermediate adhesive layer is sintered to a side of said backing layer which receives said functional layer in a manner selected from the group consisting of a rough base, a single layer and a few layers of fine particles.

14. A laminate article according to claim 1 wherein said backing layer is affixed with one of its sides to a substrate and with another of its sides supports said functional layer, said backing layer being built as a friction layer.

15. A laminate article according to claim 14 wherein a portion of said backing layer formed as a middle layer consists of a material selected from lead bronze, lead tin bronze and time bronze, and said functional layer is formed as a friction layer from a material selected from the group consisting of dispersion alloys on a base of aluminum/lead and aluminum/tin, said functional layer having a thickness ranging approximately between 10 $\mu$m and 100 $\mu$m.

* * * * *